United States Patent
Sankar

(10) Patent No.: US 11,018,532 B2
(45) Date of Patent: May 25, 2021

(54) WIRELESS POWER CHARGER

(71) Applicant: Wipqtus INC., Cupertino, CA (US)

(72) Inventor: Ganapathy Sankar, Cupertino, CA (US)

(73) Assignee: WIPQTUS INC., Cupertino, CA (US)

( * ) Notice: Subject to any disclaimer, the term of this patent is extended or adjusted under 35 U.S.C. 154(b) by 243 days.

(21) Appl. No.: 16/283,805

(22) Filed: Feb. 24, 2019

(65) Prior Publication Data

US 2020/0274404 A1 Aug. 27, 2020

(51) Int. Cl.
*H02J 50/90* (2016.01)
*H02J 7/02* (2016.01)
*H02J 50/10* (2016.01)
*H02J 50/80* (2016.01)
*H02J 50/40* (2016.01)
*H04B 5/00* (2006.01)
*H02K 41/02* (2006.01)

(52) U.S. Cl.
CPC .............. *H02J 50/90* (2016.02); *H02J 7/025* (2013.01); *H02J 50/10* (2016.02); *H02J 50/40* (2016.02); *H02J 50/80* (2016.02); *H02K 41/02* (2013.01); *H02K 2201/18* (2013.01); *H04B 5/0031* (2013.01)

(58) Field of Classification Search
CPC .. H02J 50/10; H02J 50/40; H02J 50/80; H02J 50/90; H02J 7/025; H02J 7/00034; H02J 5/005; H02K 41/02; H02K 22/0118; H04B 5/0031
USPC ........................................................ 320/108
See application file for complete search history.

(56) References Cited

U.S. PATENT DOCUMENTS

2013/0093389 A1* 4/2013 Partovi .................. H02J 50/90
320/108
2019/0356178 A1* 11/2019 Widmer .................. H02J 50/90

* cited by examiner

Primary Examiner — Paul Dinh

(57) ABSTRACT

A wireless power charger (WPC) integrated into a charging pad (CP) includes a wireless power transmitter (WPT), a location sense mechanism (LSM), a transport mechanism (TM) and a Central Control Unit (CCU). The LSM discovers and conveys the position of a portable device to the CCU when the device is placed on the CP to have its battery wirelessly charged. The LSM uses RF signaling and other capabilities in wireless connectivity standards to detect location of device. With information from the LSM, the CCU, via the TM, moves the WPTM in close proximity to the device. Once at the device position, the WPTM senses the location of the receiver coil in the device, adjusts its position via the TM to gain strong alignment and provides power wirelessly. When charging is complete or if the device is removed from the charging pad, the WPTM returns to its home-base location.

20 Claims, 8 Drawing Sheets

WIRELESS POWER CHARGER

BACKGROUND

Consumers own a large number of portable devices and they continue to buy more every Christmas, Chinese New Year, Hanukkah, etc. These devices are power hungry and drain their batteries rapidly. Having to charge daily, sometimes multiple times, consumers are looking for wireless power systems that can charge their portables fast, hassle-free and on-the-go.

A wireless power system consists of a wireless power charger and a wireless power receiver. The wireless power charger is typically a standalone device such as a charging pad; alternately, it may be integrated into another device such as a display monitor (in the pedestal), television (in the pedestal), automotive (under the dashboard), furniture-top and kitchen countertop (under the surface), etc. The wireless power receiver is typically not standalone but integrated into the portable devices such as a smartphone, tablet, wearable, glucose meter or into a sleeve that attaches externally to the portable device. Power is delivered wirelessly from the charger to the wireless power receiver. The receiver receives and conditions the power. It may then directly charge the battery or pass the power onto a neighboring Power Management System such as a Power management Integrated Circuit (PMIC), Battery Charger (BC), etc., that suitably provides power for portable's operation, charging the portable device's battery, etc.

To charge the portable's battery fast, the wireless power system will need to deliver more power to the portable's battery. And this power must be delivered at high efficiency as inefficiencies in the power delivery mechanism transform into heat. This heat may impact the operation and/or reliability of neighboring components such as the battery and be detrimental to the overall user experience.

To charge the portable's battery hassle-free, the charger should provide wireless power over a large charging area so when the user places the portable on the charger, the coil circuitry in the charger and the receiver are sufficiently aligned for good efficient power delivery. If the charger's charging area is small, then the user will need to adjust the portable placement on the charger multiple times until that proper alignment is gained. Small charging area typically leads to user frustration as it can take several attempts to gain that proper alignment sufficient to being charging.

There are multiple implementation specifications/standards in the wireless power industry. They are Wireless Power Consortium (WPC) Qi specification, the Power Matters Alliance (PMA) specification and the Alliance 4 Wireless Power (A4WP) specification. The WPC/Qi and PMA specifications have focused on delivering wireless power at high efficiency but over a small charging area. The A4WP specification has focused on delivering wireless power over a large charging area but has sacrificed efficiency in their approach. The WPC/Qi specification does attempt to increase charging area via multi-coil structures. Unfortunately, to avoid dead zones, a very high level of overlap is required amongst coils. As a result, the approach is costly and not scalable to larger dimensions of charging area.

To charge the portable's battery on-the-go, wireless power delivery is indeed the best mechanism as it eliminates the need to carry power adapters (and multiple of them for different portables) around. Wireless Power delivery is very effective in such a cause when a common approach/standard can be adopted in the home, offices, public places such as airports, hospitals, casinos, hotels, restaurants, etc. Both consumers and corporates are desiring a reliable, user-friendly solution. In addition, retail chains architects and public infrastructure commercial property developers prefer the wireless power solution to merge into their decor.

Therefore, there is an unmet need for a wireless power system that can deliver the required amount of power wirelessly at high efficiency over a large charging area to the portable in a non-obtrusive, innocuous manner. Only such a system will enable consumers charge their large range of portables hassle-free, fast and on-the-go.

SUMMARY OF THE INVENTION

Because of plethora of devices that require charging daily, consumers are looking for charging solutions that can charge fast, hassle-free and on-the-go. Fast charging can be achieved with higher power delivery but for higher power levels, maintaining high efficiency is a must. To achieve high efficiency, the transmitter coil of the wireless power transmitter and the receiver coil of the wireless power receiver must be very well aligned so as to enable maximum magnetic flux coupling between the two. For charging to be hassle-free, the wireless power system would need to support a large (charging) area over which it can guarantee such strong coil alignment.

This strong coil alignment is achieved over a large area by the wireless power charger disclosed herein by virtue of detecting the location of the device via RF signaling and relocating the wireless power transmitter to align with the wireless power receiver. The wireless power charger disclosed herein fully integrates into a charging pad case such as retail furniture, car dashboard, kitchen countertops, etc., thereby merging into the decor and aesthetics of the environment. In an embodiment, the wireless power charger is standards compliant with existing wireless power specifications thereby enabling wide adoption in the home and outside of it.

The wireless power charger's functional blocks include an input power interface Pin, a location sensing mechanism (LSM), a transport mechanism (TM) a Central Control Unit (CCU) and the wireless power transmitter (WPT). Via its input power interface Pin, the wireless power charger receives DC power from an AC/DC adaptor that is connected to a wall-wart. It may also receive DC power sourced from a battery. In an embodiment, the wireless power charger receives AC power directly from the wall-wart. The input power interface, Pin, includes power management circuits to suitably condition and distribute the power to the rest of the wireless power charger. Pin also includes analog circuitry to measure the power drawn from the external source(s).

The wireless power transmitter (WPT) of the wireless power charger disclosed herein draws power for its operations and power transfer to the wireless power receiver in the device from the Pin block. The LSM, TM and the CCU also draw power from Pin.

The Location Sense Mechanism (LSM) of the wireless power charger detects the presence of the device via RF signaling when the device is within its RF range. The LSM comprises one or more RF sub-systems and a Processing Unit. The RF sub-systems track the device in real-time and gather information such as received signal strength, direction of signal, time of flight etc., that are relevant to determining the location of the device. The Processing Unit runs its algorithms on the information gathered by the RF sub-system(s) to compute the location coordinates of the detected device. The LSM shares this location coordinates with the Central Control Unit (CCU).

The transport mechanism of the wireless power charger transports the wireless power transmitter and its transmitting coil to the required location coordinates provided to it by Central Command Unit (CCU). In an embodiment, only the transmitting coil is carried around by the transport mechanism while the rest of the wireless power transmitter circuity remains stationary. The wireless power transmitter and its transmitting coil are disposed within the inside surface of the top plate of the charging pad case in a manner that allows it to move along the inside of the top plate. The wireless charger includes a home-base location to which the wireless power transmitter is returned to when wireless power transmission conditions have ended. The transport mechanism implements travel distances larger than the calculated distances to transport said wireless power transmitter to said home-base location reliably absorbing moving mechanism slippage to reach the home-base location.

Any configuration of transport mechanism can be used to move the wireless power transmitter in the X-axis and Y-axis direction. In an embodiment, the transport mechanism includes an X-axis servomotor and Y-axis servomotor controlling which the wireless power transmitter and its transmitting coil are moved along the inside of the top plate of the charging pad to a position in close proximity to the device to be charged.

The Central Control Unit coordinates the operations within the wireless power charger. On power-up, the CCU obtains the location coordinates of the WPT from the LSM. It instructs the TM to return the WPT to home-base location coordinates if the WPT is not already there. It then instructs the LSM to scan for devices in the vicinity. When it detects a device(s), the LSM computes and provides the location coordinates of the device(s) to the CCU. Once the device is stationary on the charging pad and the device's location coordinates are within the range of the transport mechanism, the CCU instructs the TM to transport the WPT to the determined coordinates.

The CCU receives feedback from the TM once the WPT has been transported to the determined coordinates. At this point, the CCU activates the WPT and the WPT seeks out the wireless power receiver coil of the device. The WPT takes the help of the CCU to fine-tune its location (via commands to the TM) based on the coupling that it senses with the wireless power receiver coil. Once good alignment is achieved, WPT provides power wirelessly to the wireless power receiver in the device. In an embodiment, once good alignment is achieved, the WPT provides initial nominal power to just wake up said wireless power receiver, exchange messages in a standards compliant manner with a wireless power specification such as Qi and establish a power contract based on which it begins larger power transfer wirelessly to said wireless power receiver.

During charging, the CCU receives status updates from the WPT which it may reflect on a display panel, LEDs, etc. When the device is fully charged, the WPT informs the CCU. The CCU instructs the TM to return the WPT to the home-base location coordinates. During charging, if device is removed, the WPT informs the CCU. The CCU checks with LSM for the updated coordinates of the device that was being charged. If the device was indeed removed off the table based on the updated coordinates, the CCU instructs the TM to return the WPT to the home-base location coordinates. If the device is still on the charging pad but was displaced to another location that is within the operating range of the TM, then the CCU instructs the TM to transport the WPT to the new coordinates reaching which WPT gains coil alignment again and resumes charging.

In an embodiment, the wireless power charger includes a plurality of wireless power transmitters to charge simultaneously a plurality of devices that are placed on charging pad. Following boot-up, each of the WPTs are located and positioned at their respective home-bases. The operation as illustrated in flowcharts FIGS. 5 and 6 apply individually to each of the WPTs and are executed by the shared LSM, TM and CCU. In an embodiment, each of the WPTs have their own TM but the LSM and CCU are still shared among the WPTs. The LSM and CCU detect devices that are placed on the charging pad, identify free WPTs in the vicinity and dispatch them via their TMs to the device's location to have them charged. The operation illustrated in FIGS. 5 and 6 thereby effectively apply in drive the charging of each of the plurality of devices with the plurality of available wireless power transmitters.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 3A exemplarily illustrates a first embodiment conceptual block diagram view of the wireless charger disclosed here in.

FIG. 3B exemplarily illustrates a second embodiment conceptual block diagram view of the wireless charger disclosed here in.

FIG. 3C exemplarily illustrates a third embodiment conceptual block diagram view of the wireless charger disclosed here in.

DETAILED DESCRIPTION OF THE INVENTION

Figure 1:
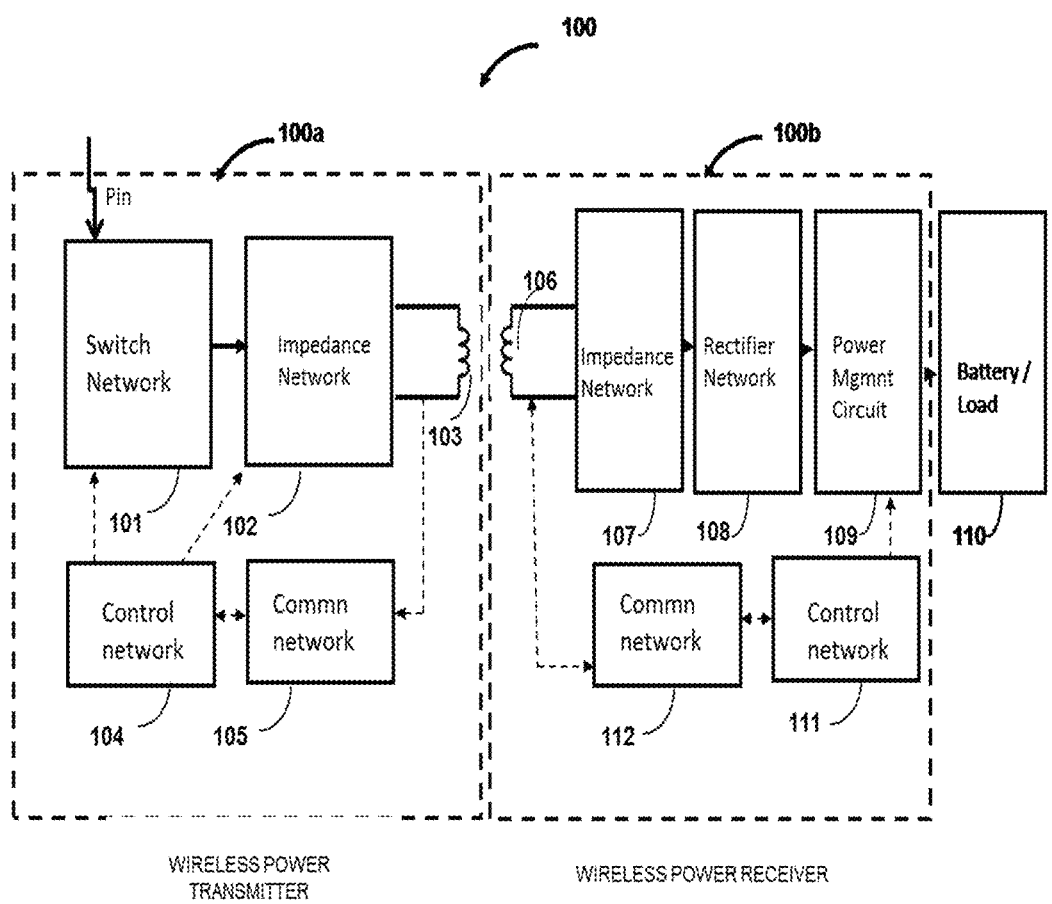
FIG. 1 exemplarily illustrates a schematic diagram of a wireless power transmitter and a wireless power receiver whose transmitting coil and receiving coil respectively are well aligned. The magnetic flux field would hence be ideally coupled ensuring maximum efficiency when significant power is transferred wirelessly thereby paving the way for fast charging.

FIG. 1 exemplarily illustrates a schematic diagram of a wireless power system 100 comprising a wireless power transmitter 100a and a wireless power receiver 100b. The wireless power transmitter 100a receives power via Pin. With the power received, the wireless power transmitter 100a generates an alternating magnetic field to a coupling region for providing energy transfer to the wireless power receiver 100b. The alternating magnetic field is created by passing an alternating current into a transmitter coil 103. The wireless power transmitter 100a includes one or more transmitter coils 103. The alternating current may be passed into one transmitter coil or multiple transmitter coils 103 simultaneously.

The wireless power transmitter 100a comprises a switch network 101, an impedance network 102, a control network 104, a communication network 105 and transmitter coil(s) 103 as exemplarily illustrated in FIG. 1. The switch network 101 comprises transistors that are configured to change a state, for example, into an on state or an off state, based on signals supplied to the switch network 101 from the control network 104. In one embodiment, the switch network 101 is configured as an inverter in one of multiple inverter topologies, for example, a half bridge inverter topology, a full bridge inverter topology, a class D inverter topology, a class E inverter topology, etc.

The impedance network 102 is configured as a fixed network or a variable matching/tuning network. The impedance network 102 is connected between the switch network 101 and a transmitter coil 103. The impedance network 102 comprises one or more of passive electronic components, for example, a resistor, a capacitor, an inductor, etc.; active electronic components, for example, a transistor such as a metal oxide semiconductor field effect transistor (MOSFET), mosfet/gate drivers, operational amplifiers, directional coupler, etc., and electronic switches. The impedance network 102 helps set the resonant frequency bias of the wireless power transmitter 100a. It may include various tuning and matching mechanisms to compensate for changes in the resonant frequency bias, load conditions, magnetic flux coupling conditions, etc., so as to regulate and optimize the power transmitted to the wireless power receiver 100b.

The control network 104 of the wireless power transmitter 100a includes a logic/firmware-driven circuit, for example, a state machine, a microcontroller, etc. Various analog signals from the different blocks in the wireless power transmitter 100a are fed to the control network 104 of the wireless power transmitter 100a. The analog signals may be converted to digital signals via an analog to digital converter (ADC) included in the control network 104. The control network 104 is hence aware of important dynamic circuit characteristics in the wireless power transmitter 100a. The control network 104 is also aware of important dynamic circuit characteristics of the wireless power receiver 100b via messages from the wireless power receiver 100b that are received and processed in the Commn network 105.

The Commn network 105 senses, filters and decodes messages from the wireless power receiver 100b. These messages may be received in-band via the magnetic field that is enabling the power transfer. They may also be received via an out-of-band connection such as via a Bluetooth, WiFi (IEEE802.11), Infrared, LED, Ultrasound, etc. The Commn network 105 provides the deciphered message information to the control network 104. With the inputs received, the control network 104 appropriately configures the switch network 101 and the impedance network 102. When the transmitter coil 103 comprises of multiple coils, the control network 104 selects and activates the transmit coil that has sufficient magnetic flux coupling with the receiver to deliver the power required. In some scenarios, the control network 104 may recognize that multiple coils may need to be activated to deliver the power required to the receiver. In such a case, the control network 104 may select multiple such coils. A transmitter coil 103 is activated for power delivery via switches in the impedance network 102. The control network 104 also drives the PWM signal to the switch network 102 adhering to the appropriate frequency range and duty cycle range. The control network 104 enables or disables electronic components in the impedance network 102 using general purpose input/outputs (GPIOs) and switches.

The transmitter coil 103 is configured to wirelessly transmit power to the wireless power receiver 100b. Via the transmitter coil 103, the wireless power transmitter 100a generates a varying magnetic field to a coupling region for providing energy transfer to the wireless power receiver 100b. When the wireless power receiver 100b is placed on the wireless power transmitter 100a, the receiver coil 106 intersects a portion of the magnetic flux lines from the transmitter coil 103. Such an intersection of a varying magnetic field induces energy transfer into the receiver coil 106.

The wireless power receiver 100b also includes an impedance network 107, rectifier network 108, power management circuit 109, load/battery 110, control network 111 and Commn network 112. The wireless power receiver 100b receives wireless power from the wireless power transmitter 100a via receiver coil 106. The impedance network 107 contains circuitry to bias the power transfer via the receiver coil. The impedance network comprises one or more of passive electronic components, active electronic components, and electronic switches. The rectifier network 108 conditions the alternating-current (AC) wireless power into direct-current (DC) wireless power. The rectifier network 108 contains capacitors that significantly reduce the ripple in their DC power output; however the output voltage of the rectifier network 108 is unregulated. The power management circuit 109 may be one of Low-DropOut (LDO), Buck, Boost, Buck-Boost voltage regulators. The power management circuit 109 regulates the DC power from the rectifier network's 108 to a set voltage range that is suitable for consumption by the load 110. The load 110 is an external element that is collocated along with the wireless power receiver 100b in the portable device. The load 110 maybe a Power Management Integrated Circuit (PMIC) that provides power for the device's operation, a Battery Charger (BC) that charges the device's battery, resistive load, etc. The control network 111 exchanges various messages via the Commn block 112 with the wireless power transmitter 100a. Messages may be one-way from the wireless power receiver 100b to the wireless power transmitter 100a or in both directions. Messages are exchanged for various reasons such as for identification, to stop, maintain, increase or decrease the amount of wireless power transmitted based on the requirement and dynamic needs of the load 110. The control network 111 also includes protection circuitry which monitors the internal dynamic circuit characteristics of the wireless power receiver 100b and takes rapid evasive action if the circuit characteristics are not within acceptable bounds.

Because of plethora of devices that require charging daily, consumers are looking for charging solutions that can charge fast, hassle-free and on-the-go. Fast charging can be achieved with higher power delivery but for higher power levels, maintaining high efficiency is a must. To achieve high efficiency, the transmitter coil 103 of the wireless power transmitter 100a and the receiver coil 106 of the wireless power receiver 100b must be very well aligned so as to enable maximum magnetic flux coupling between the two. For charging to be hassle-free, the wireless power system would need to support a large (charging) area over which it can guarantee such strong coil alignment.

This strong coil alignment is achieved over a large area by the wireless power charger disclosed herein by virtue of detecting the location of the device via RF signaling and relocating the wireless power transmitter 100a to align with the wireless power receiver 100b. The wireless power charger disclosed herein fully integrates into a charging pad case such as in retail furniture, car dashboard, kitchen countertops, etc., thereby merging into the decor and aesthetics of the environment. In an embodiment, the wireless power charger is standards compliant with existing wireless power specifications thereby enabling wide adoption in the home and outside of it.

Figure 2:
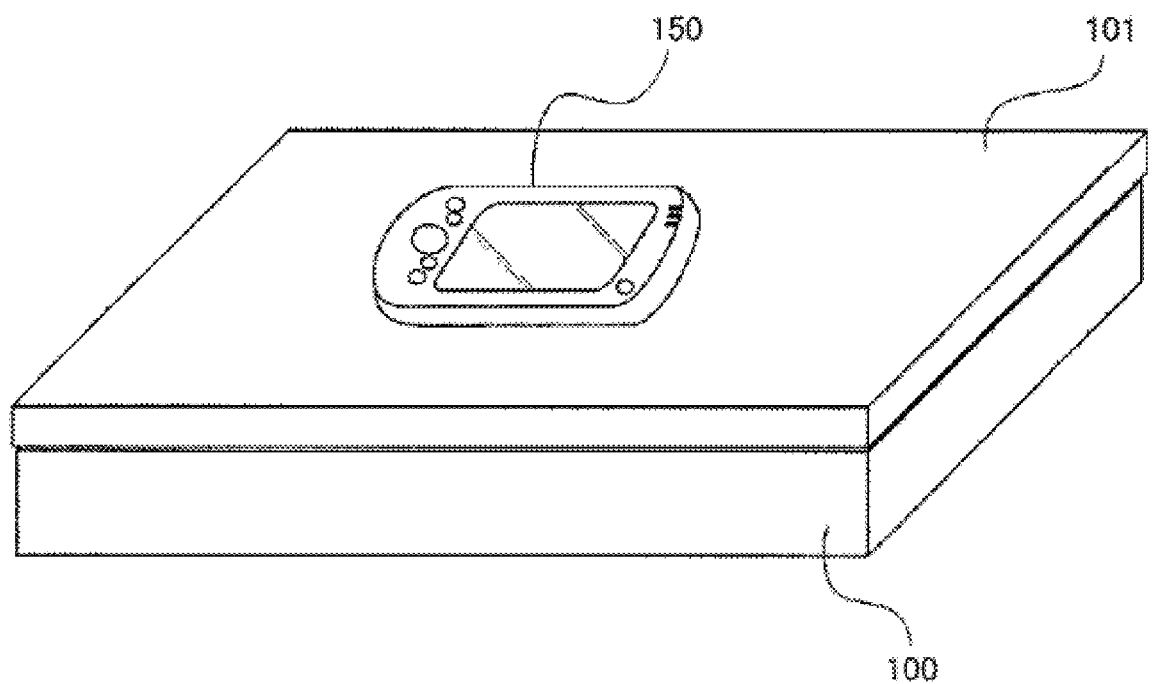
FIG. 2 exemplarily illustrates an external view of the charging pad on which a mobile phone has been placed. The wireless charger disclosed herein is integrated into the charging pad and aims to position its wireless power transmitter in close proximity to the wireless power receiver in the mobile phone thereby enabling large charging area and efficient wireless power transfer.

FIG. 2 exemplarily illustrates an external view of such a charging pad case 101. A mobile phone 150 has been placed on it for being charged wirelessly. The wireless power charger 100 disclosed herein is integrated into the charging pad case 101 and aims to position its wireless power transmitter 100a in close proximity to the wireless power receiver 100b in the mobile phone thereby enabling efficient wireless power transfer over all or most of the area of the charging pad case 101.

Figure 3A:
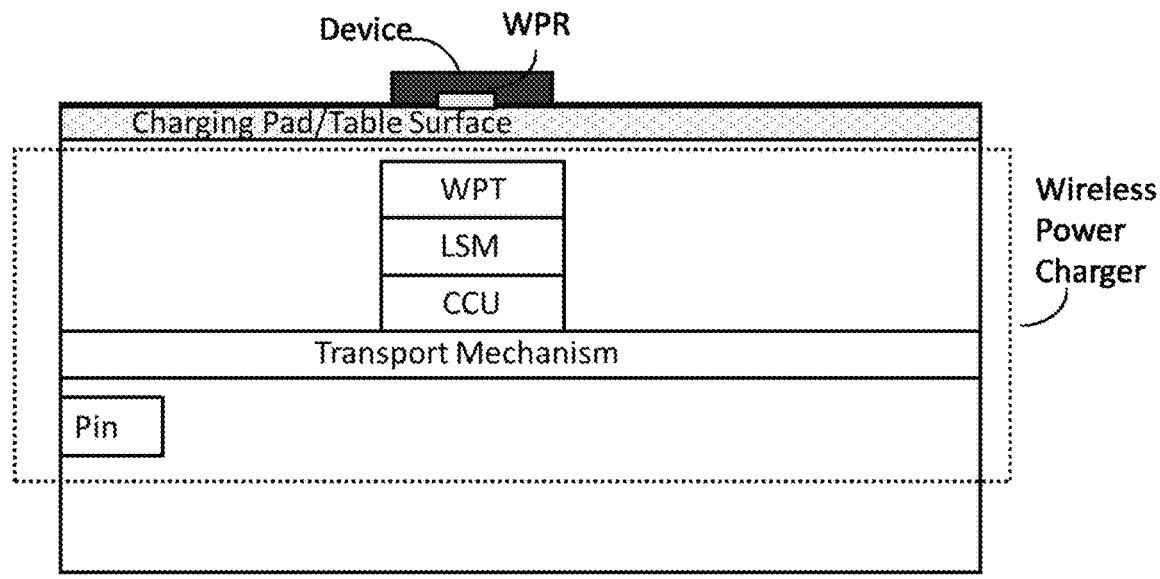
Figure 3B:
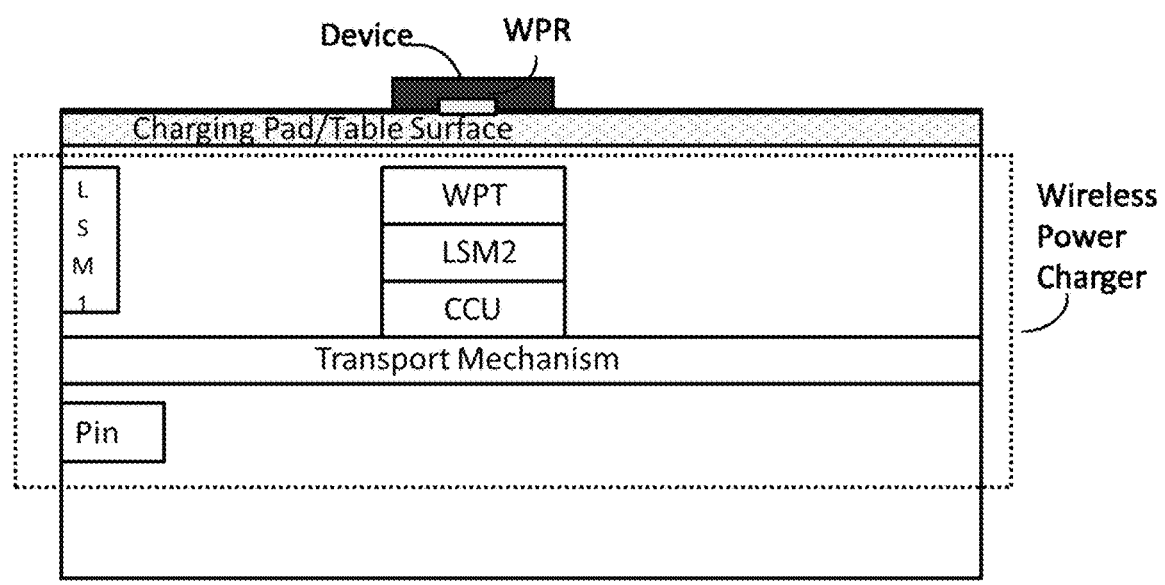
Figure 3C:
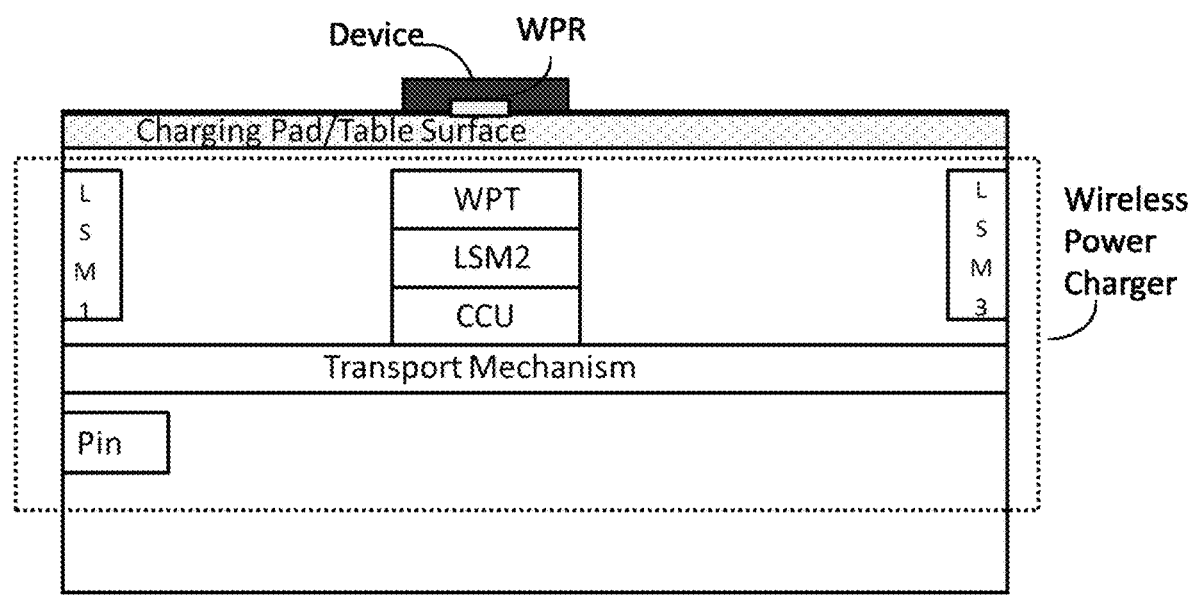

In FIGS. 3A-3C the wireless power charger is exemplarily illustrated integrated in a charging pad/table. The wireless power charger's functional blocks include an input power interface Pin, a location sensing mechanism (LSM), a transport mechanism (TM) a Central Control Unit (CCU) and the wireless power transmitter (WPT) as illustrated in FIGS. 3A-3C. Via its input power interface Pin, the wireless power charger receives DC power from an AC/DC adaptor that is connected to a wall-wart. It may also receive DC power sourced from a battery. In an embodiment, the wireless power charger receives AC power directly from the wall-wart. The input power interface, Pin, includes power management circuits such as LDOs, Rectifiers, Bucks, Boosts, Buck-Boosts, PMICs, mosfets, drivers, etc., and their associated support elements such as inductors, capacitors, resistors, diodes, etc., to suitably condition and distribute the power to the rest of the wireless power charger. Pin also include analog circuitry such as operational amplifiers, current sense circuitry, ADCs, etc., to measure the power drawn from the external source(s).

The wireless power transmitter (WPT) of the wireless power charger disclosed herein draws power for its operations and for power transfer to the wireless power receiver in the device from the Pin block. The WPT's operation is as previously described and is illustrated as wireless power transmitter 100a in FIG. 1. The LSM, TM and the CCU also drawn power from Pin and their operations are described in the following paragraphs.

The Location Sense Mechanism (LSM) of the wireless power charger detects the presence of the device via RF signaling when the device is within its RF range. The LSM comprises one or more RF sub-systems and a Processing Unit. The RF sub-systems track the device in real-time and gather information such as received signal strength, direction of signal, time of flight etc., that are relevant to determining the location of the device. In an embodiment, the RF sub-systems operate in compliance with the specifications of one or more wireless data connectivity standards such as Bluetooth, IEEE 802.11 (WiFi), Near Field Communication (NFC), Ultra-Wideband (UWB). An RF sub-system includes all the appropriate blocks needed for smooth inter-operability with the device(s) such as antennas, Power Amplifiers, RF transceiver, PHY and MAC protocol layers, clocks, power management unit, a micro-controller unit (MCU), memory, analog blocks, gpios, etc. The RF sub-system includes a single antenna or multiple antennas arranged in an array or a combination of both. The RF sub-system may query the device to be charged for its internal information such as that from the device's accelerometer, gyroscope, GPS, etc. The RF sub-system(s) provides all the gathered information regarding the detected device to the Processing Unit of the LSM. The Processing Unit runs its algorithms such as trilateration, triangulation, etc., on the information provided by the RF sub-system(s) to compute the location coordinates of the detected device. The LSM shares this location coordinates with the Central Control Unit (CCU).

FIG. 3A illustrates an embodiment of the wireless power charger wherein its LSM with its RF sub-system(s) and Processing Unit is physically organized in one place. The one or more RF sub-systems, for example a UWB RF sub-system and an NFC RF sub-system, sense and view the device to be charged from that one vantage point. In the embodiment of the wireless power charger illustrated in FIG. 3B, the LSM is organized as LSM1 and LSM2; for example, LSM1 may contain a Bluetooth RF sub-system and LSM2 may contain a WiFi RF sub-system and the Processing unit. This provides the LSM with 2 vantage points to sense and view the device to be charged. In the embodiment of the wireless power charger illustrated in FIG. 3C, the LSM is organized as LSM1, LSM2 and LSM3; for example, LSM1 may contain a BlueTooth RF sub-system and LSM2 may contain a second Bluetooth RF sub-system and the Processing unit and LSM3 may contain a third Bluetooth RF sub-system. This provides the LSM with 3 vantage points to determine the location of the device when placed on the charging pad.

Figure 4:
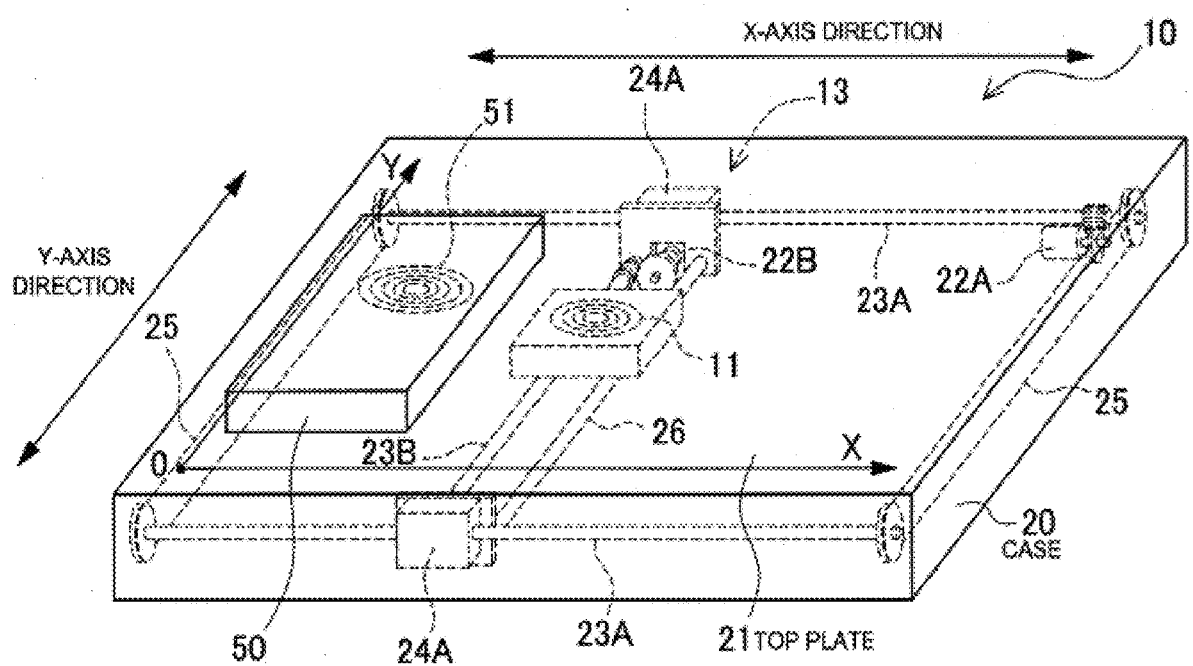
FIG. 4 exemplarily illustrates an oblique conceptual, structural view of the wireless charger disclosed herein that is integrated in a charging pad.

The transport mechanism (TM) of the wireless power charger transports the wireless power transmitter and its transmitting coil 11 to the required location coordinates provided to it by Central Command Unit (CCU). In an embodiment, only the transmitting coil(s) is carried around by the transport mechanism while the rest of the wireless power transmitter circuitry remains stationary. FIG. 4 exemplarily illustrates an embodiment of the transport mechanism. In FIG. 4, a device 50 is placed on the top plate 21 of the charging pad 10 for its battery to be charged wirelessly through its receiver coil 51. Device 50 maybe a portable device or a non-portable device or a sleeve that attaches externally to another device. The wireless power transmitter and its transmitting coil 11 are disposed within the inside surface of the top plate 21 of the charging pad case 20 in a manner that allows it to move along the inside of the top plate 21. Not explicitly shown in FIG. 4, the LSM, CCU and the input power source Pin are also contained within case 20 of the Charging pad 10. The wireless charger includes a home-base location to which wireless power transmitter is transported back to when wireless power transmission conditions have ended. The transport mechanism implements travel distances larger than the calculated distances to transport said wireless power transmitter to home-base location reliably absorbing moving mechanism slippage to reach the home-base location.

Any configuration of transport mechanism can be used to move the wireless power transmitter in the X-axis and Y-axis direction. An embodiment of such a transport mechanism is exemplarily illustrated in FIG. 4. In this embodiment, the transport mechanism includes an X-axis servomotor 22A and Y-axis servomotor 22B controlling which the wireless power transmitter and its transmitting coil 11 are moved along the inside of the top plate 21 of the charging pad 10 to a position in close proximity to the device 50. The transport mechanism 13 rotates threaded rods 23A and 23B via the servomotors 22A and 22B to move nut blocks 24A that are threaded onto threaded rods 23A and 23B. The pair of X-axis threaded rods 23A are disposed parallel to each other and are connected via belts 25 to rotate together when driven by servomotor 22A. Further, the transport mechanism has a guide rod 26 disposed parallel to the Y-axis threaded rod 23B to move the wireless power transmitter and its transmitting coil 11 in the Y-axis direction while retaining its horizontal orientation. The guide rod 26 is connected at both ends to the X-axis nut blocks 24A and moves together with them. The guide rod 26 passes through a guide block attached to the wireless power transmitter and its transmitting coil 11 to allow movement along the guide rod in the Y-axis direction.

Figure 5:
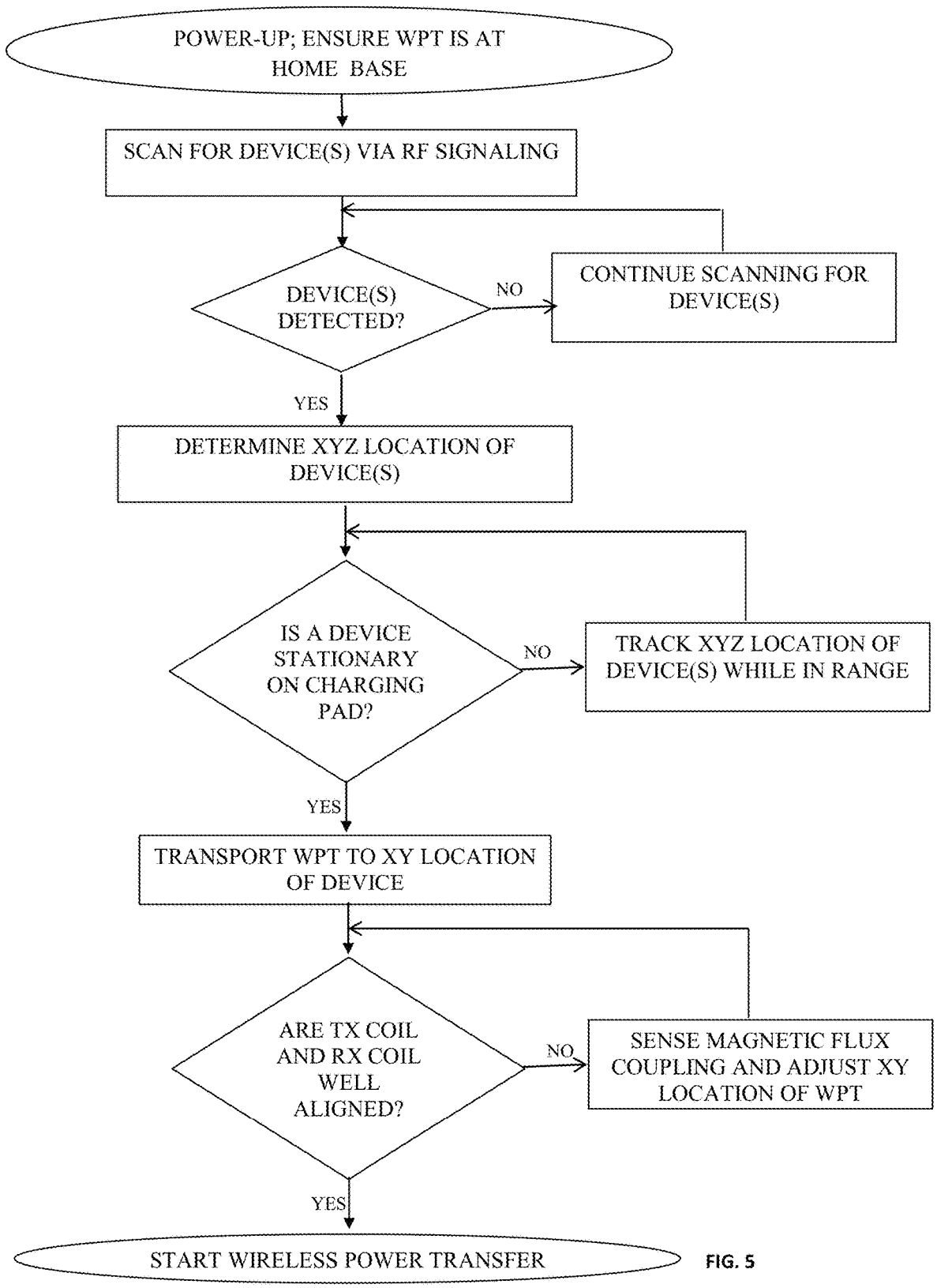
FIG. 5 exemplarily illustrates a flow diagram describing the operation of the wireless power charger disclosed herein upto the start of wireless power transfer.
Figure 6:
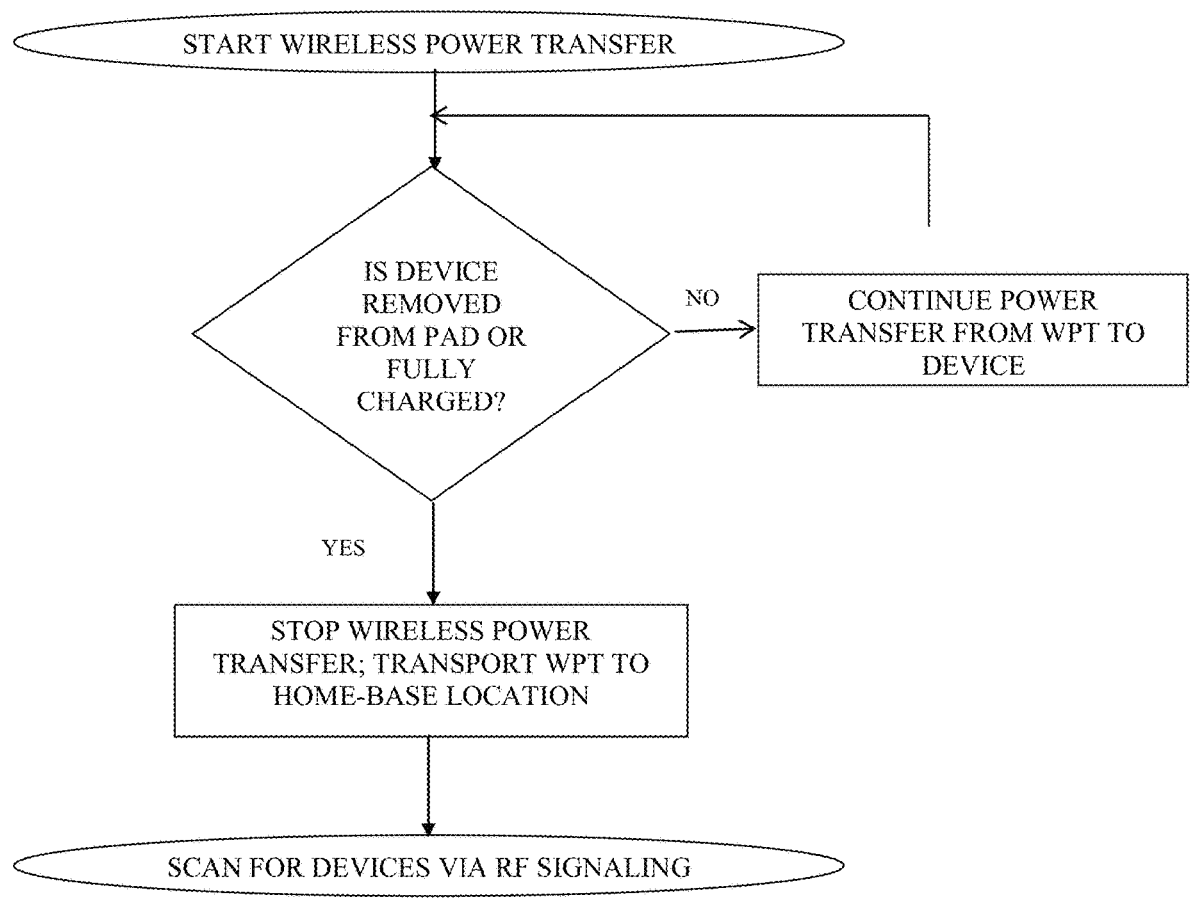
FIG. 6 exemplarily illustrates a flow diagram describing the operation of the wireless power charger disclosed herein following the start of wireless power transfer.

The Central Control Unit coordinates the operations within the wireless power charger as illustrated in the flow diagrams FIGS. 5 and 6. On power-up, the CCU obtains the location coordinates of the wireless power transmitter (WPT) from the Location Sensing Mechanism (LSM). It instructs the transport mechanism (TM) to return the WPT to home-base location coordinates if the WPT is not already there. It then instructs the LSM to scan for devices in the vicinity. When it detects a device(s), the LSM computes and provides the location coordinates of the device(s) to the CCU. Based on the locations received, the CCU determines if the device has been placed on the charging pad and if the device is stationary. Because of the RF range, quite often the device may be above the charging pad surface. The device may also be on the charging pad but not stationary. In such cases, the CCU observes the trajectory of the device but maintains the TM and WPT in a low power inactive state. Once the device is stationary on the charging pad and the device's location coordinates are within the range of the transport mechanism, the CCU instructs the TM to transport the WPT to the determined coordinates.

The CCU receives feedback from the TM once the WPT has been transported to the determined coordinates. At this point, the CCU activates the WPT and the WPT seeks out the wireless power receiver coil of the device. The WPT takes the help of the CCU to fine-tune its location (via commands to the TM) based on the coupling that it senses with the wireless power receiver coil. Once good alignment is achieved, WPT provides power wirelessly to the wireless power receiver in the device. In an embodiment, once good alignment is achieved, the WPT provides initial nominal power to just wake up said wireless power receiver, exchange messages in a standards compliant manner with a wireless power specification such as Qi and establish a power contract based on which it begins larger power transfer wirelessly to said wireless power receiver.

During charging, the CCU receives status updates from the WPT which it may reflect on its reporting interfaces such as a display panel, LEDs, etc. Prior to charging, it may provide error flag indications such as the charger being outside of the range of the transport mechanism. Following completion of charging, it may indicate report information such as for how long the device was charged.

When the device is fully charged, the WPT informs the CCU of charging completion. The CCU instructs the TM to return the WPT to the home-base location coordinates. During charging, if device is removed, the WPT informs the CCU of charging disconnection. The CCU checks with LSM for the updated coordinates of the device that was being charged. Based on the updated coordinates, if the device was indeed removed off the table, the CCU instructs the TM to return the WPT to the home-base location coordinates. If the device was indeed removed off the table, if the device were still on the charging pad but displaced to another location that were still within the operating range of the TM, then the CCU instructs the TM to transport the WPT to the new coordinates reaching which WPT gains coil alignment again and resumes charging.

Figure 7A:
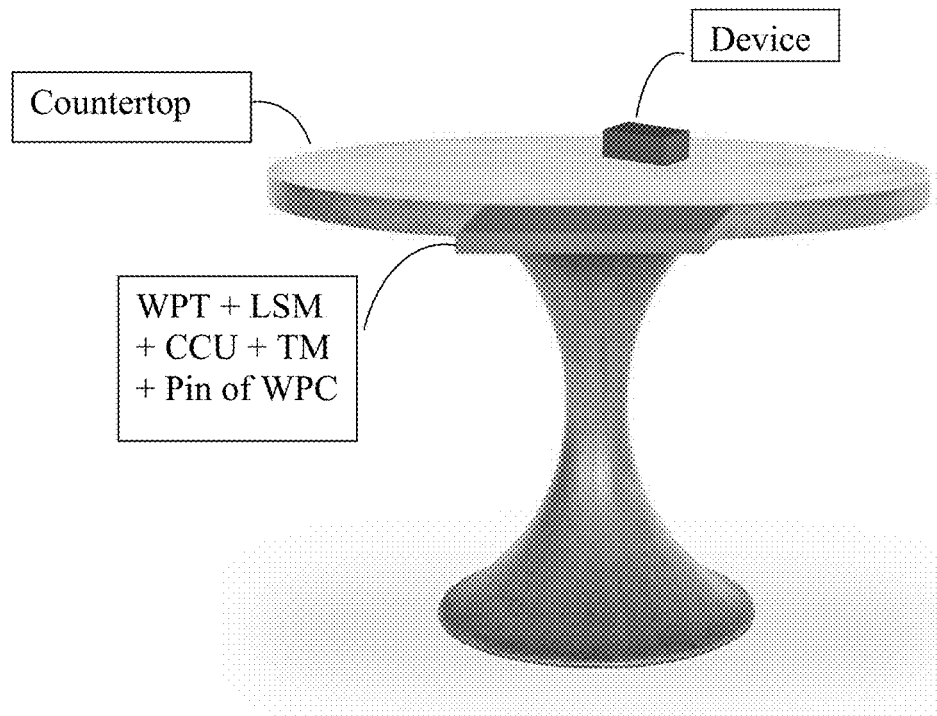
FIG. 7A exemplarily illustrates a circular charging table in which the first embodiment of the wireless power charger disclosed herein is integrated.
Figure 7B:
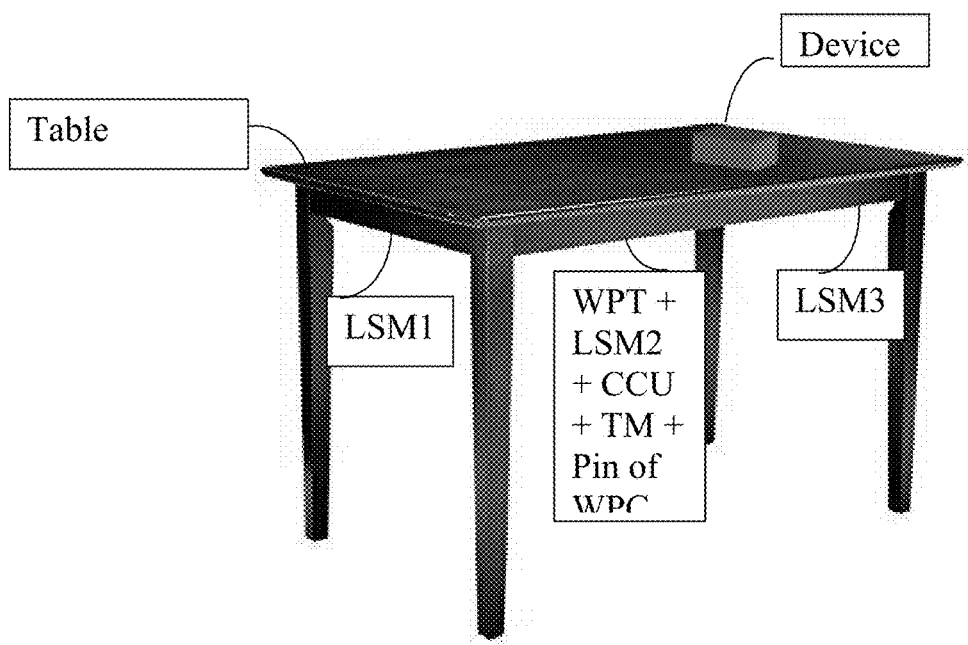
FIG. 7B exemplarily illustrates a rectangular charging table in which the third embodiment of the wireless power charger disclosed herein is integrated.

FIG. 7A exemplarily illustrates a circular counter-top in which the first embodiment of the wireless power charger illustrated in FIG. 3A is integrated. The counter-top may be in granite, wood, plastic, glass or any other material that is suitable for a counter-top. FIG. 7B exemplarily illustrates a rectangular charging table in which the third embodiment of the wireless power charger illustrated in FIG. 3C is integrated. The table may also be manufactured in different material. The wireless power charger disclosed herein could be similarly integrated into car dashboards, furniture in hotels/airports/hospitals/restaurants/casinos/offices/etc.

In an embodiment, the wireless power charger includes a plurality of wireless power transmitters to charge simultaneously a plurality of devices that are placed on charging pad. Following boot-up, each of the WPTs are located and positioned at their respective home-bases. The operation as illustrated in flowcharts FIGS. 5 and 6 apply individually to each of the WPTs and are executed by the shared LSM, TM and CCU. In an embodiment, each of the WPTs have their own TM but the LSM and CCU are still shared among the WPTs. The LSM and CCU detect devices that are placed on the charging pad, identify free WPTs in the vicinity and dispatch them via their TMs to the device's location to have them charged. The operation illustrated in FIGS. 5 and 6 thereby effectively apply in drive the charging of each of the plurality of devices with the plurality of available wireless power transmitters.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A wireless power charger that is integrated into a charging pad, said wireless power charger transmitting power wirelessly to an inductively coupled wireless power receiver that is housed in a device, said wireless power receiver drawing power wirelessly to charge said device's battery and for said device's system operations, said wireless power charger comprises:

an input power interface configured to receive power from external sources, said input power interface conditions said received power suitably for use of said wireless power charger;

a central control unit (CCU) configured to coordinate operations in said wireless power charger, a wireless power transmitter configured to deliver power wirelessly from said input power interface to said wireless power receiver housed in said device, a location sense mechanism that senses location coordinates of said device and said wireless power transmitter, said location sense mechanism comprises;

one or more of radio frequency (RF) sub-systems, said RF sub-systems sensing information relevant to the location coordinates via RF signaling;

a processing unit having embedded internal algorithms, said processing unit computes location coordinates based on said embedded internal algorithms applied on the information sensed by said RF sub-systems;

wherein when said central control unit determines that said device has been placed on said charging pad based on location coordinates sensed and computed by said location sense mechanism, said central control unit, via said transport mechanism, transports said wireless power transmitter to a close proximity of said device's wireless power receiver for said wireless power transmitter to transmit power wirelessly to said wireless power receiver in said device.

2. The wireless power charger of claim 1, wherein said RF sub-systems operate in compliance with the specifications of one or more wireless data connectivity standards including IEEE802.11 (WiFi), Near Field Communication (NFC).

3. The wireless power charger of claim 1, wherein said RF sub-systems include a single antenna or multiple antenna arranged in an array or a combination of both.

4. The wireless power charger of claim 1, wherein said transport mechanism includes servo motors to move said wireless power transmitter.

5. The wireless power charger of claim 1, wherein said wireless charger includes a home-base location to which said wireless power transmitter is transported back to when wireless power transmission conditions have ended.

6. The wireless power charger of claim 1, wherein said transport mechanism implements travel distances larger than calculated distances to transport said wireless power transmitter to said home-base location reliably absorbing moving mechanism slippage to reach said home-base location.

7. The wireless power charger of claim 1, wherein said input power interface receives AC power from external source, conditions suitably for use of said wireless power charger.

8. The wireless power charger of claim 1, wherein said transport mechanism transports only said transmitter coil rest of said wireless power transmitter circuitry is stationary.

9. The wireless power charger of claim 1, wherein said wireless power charger includes a plurality of said wireless power transmitters and said transport mechanisms to charge simultaneously a plurality of said devices that are placed on said charging pad.

10. The wireless power charger of claim 1, wherein said transport mechanism additionally transports said location sense mechanism.

11. The wireless power charger of claim 1, wherein said CCU includes a reporting interface on which the CCU provides flags and status updates prior-to-charging, during charging and at the end-of-charging.

12. A method for efficiently transmitting power wirelessly from a wireless power charger that is integrated into a charging pad, to a wireless power receiver that is integrated into a device that is placed on the charging pad, said method comprising:

providing said wireless power charger comprising:

an input power interface configured to receive power from external sources, said input power interface conditions said received power suitably for use of said wireless power charger;

a central control unit configured to coordinate operations in said wireless power charger;

a wireless power transmitter operatively connected to said input power source, said wireless power transmitter configured to deliver power from said input power source wirelessly to said wireless power receiver housed in said device;

a transport mechanism configured to transport said wireless power transmitter based on commands from said central control unit;

a location sense mechanism that senses location coordinates of said device and said wireless power transmitter, said location sense mechanism comprising:

one or more of radio frequency (RF) sub-systems, said RF sub-systems sensing information relevant to the location coordinates via RF signaling;

a processing unit having embedded algorithms, said processing unit computes the location coordinates based on said embedded internal algorithms applied on the information sensed by said RF sub-systems booting up on receiving power;

detecting location of said wireless power transmitter;

scanning and detecting a presence of said device in a vicinity of said wireless power charger;

computing said device's location coordinates and determining that said device is placed and stationary on said wireless charging pad;

transporting said wireless power transmitter to a close proximity of said device;

determining relative separation between coil of said wireless power transmitter and coil of said wireless power receiver and fine-tuning said wireless power transmitter's location such that the said coils are transmitting said power wirelessly from said wireless power transmitter to said wireless power receiver in said device;

ending said wireless power transfer when said device is fully charged or said device is removed from said charging pad.

13. The method of claim 12, wherein said RF sub-systems operate in compliance with the specifications of one or more wireless data connectivity standards including, IEEE802.11 (WiFi), NFC.

14. The method of claim 12, wherein said wireless power transmitter post-aligning its coil with said wireless power receiver's coil, said wireless power transmitter provides initial nominal power to just wake up said wireless power receiver, exchange messages and establish a power contract based on which it provides further power transfer wirelessly to said wireless power receiver.

15. The method of claim 12, wherein said transport mechanism transports only said transmitter coil while the rest of said wireless power transmitter circuitry is stationary.

16. The method of claim 12, wherein said wireless power charger includes a plurality of said wireless power transmitters to charge simultaneously a plurality of said devices that are placed on said charging pad, method of claim 12, following wireless power charger bootup, is applied individually detect and wirelessly charge each of the plurality of said devices with the plurality of available said wireless power transmitters.

17. The method of claim 12, wherein said CCU includes a reporting interface on which the CCU provides flags and status updates prior-to-charging, during charging and at the end-of-charging.

18. The method of claim 12, wherein said input power interface receives AC power from external source, conditions suitably for use of said wireless power charger.

19. The method of claim 12, wherein following bootup, said wireless power charger detecting location of its said wireless power transmitter and transporting said wireless power transmitter to home base location if not already there.

20. The method of claim 12, wherein following end of wireless power transfer, said wireless power charger returns said wireless power transmitter to said home base location if not already there.

* * * * *